United States Patent
Dinu (10) Patent No.: US 8,240,152 B2
(45) Date of Patent: Aug. 14, 2012

(54) CONTROL SYSTEMS AND METHOD FOR CONTROLLING A LOAD POINT OF A GAS TURBINE ENGINE

(75) Inventor: Constantin Dinu, Greer, SC (US)

(73) Assignee: General Electric Company, Schenectady, NY (US)

(*) Notice: Subject to any disclaimer, the term of this patent is extended or adjusted under 35 U.S.C. 154(b) by 15 days.

(21) Appl. No.: 13/218,712

(22) Filed: Aug. 26, 2011

(65) Prior Publication Data

US 2011/0308256 A1  Dec. 22, 2011

Related U.S. Application Data

(62) Division of application No. 12/098,906, filed on Apr. 7, 2008.

(51) Int. Cl.
*F02C 9/00* (2006.01)
(52) U.S. Cl. .......................................... 60/773; 60/39.5
(58) Field of Classification Search .............. 60/39.27, 60/39.281, 39.5, 235, 773; 415/148, 150, 415/208.1, 208.2, 210.1, 211.2
See application file for complete search history.

(56) References Cited

U.S. PATENT DOCUMENTS

| | | | |
|---|---|---|---|
| 3,383,090 A | 5/1968 | McLean | |
| 3,508,395 A | 4/1970 | Sebestyen | |
| 3,609,976 A | 10/1971 | Kelly | |
| 3,638,422 A * | 2/1972 | Loft et al. | 60/39.281 |
| 5,209,634 A | 5/1993 | Owczarek | |
| 5,257,906 A | 11/1993 | Gray et al. | |
| 6,261,055 B1 | 7/2001 | Owczarek | |
| 7,293,415 B2 | 11/2007 | Hoffmann et al. | |
| 7,422,414 B2 | 9/2008 | Fujii et al. | |
| 7,549,292 B2 | 6/2009 | Peck et al. | |
| 2004/0255595 A1 | 12/2004 | Morgan et al. | |
| 2006/0201132 A1 | 9/2006 | Hirayama et al. | |
| 2007/0031238 A1 | 2/2007 | Fujii et al. | |
| 2007/0074516 A1 | 4/2007 | Peck et al. | |
| 2008/0063516 A1 | 3/2008 | Fridsma | |

* cited by examiner

*Primary Examiner* — Louis Casaregola
*Assistant Examiner* — Phutthiwat Wongwian
(74) *Attorney, Agent, or Firm* — Cantor Colburn LLP

(57) ABSTRACT

Control systems and a method for controlling a load point of a gas turbine engine are provided. A control system includes a controller that receives a temperature signal and a pressure signal associated with exhaust gases from the gas turbine engine. The controller is further configured to generate the fuel control signal. The controller is further configured to generate an actuator control signal such that flow restriction member is moved from the first operational position to the second operational position to restrict the flow path such that the exhaust gases have a temperature level within a desired turndown temperature range, the pressure level in the exhaust gases is less than a threshold pressure level, and the load point of the gas turbine engine is adjusted to toward a target load point.

12 Claims, 6 Drawing Sheets

CONTROL SYSTEMS AND METHOD FOR CONTROLLING A LOAD POINT OF A GAS TURBINE ENGINE

CROSS REFERENCE TO RELATED APPLICATIONS

This is a divisional application of application Ser. No. 12/098,906, filed Apr. 7, 2008.

BACKGROUND OF THE INVENTION

The present application relates generally to gas turbines engines, and more specifically to control systems and a method for controlling a load point of a gas turbine engine.

Environmental regulations require power generation industry to continually lower its pollutions levels. The pollutants most commonly regulated are nitrogen oxides (NOx) and carbon monoxide (CO). NOx emissions are generally associated with relatively a high temperature combustion process, while CO could be related to either a relatively high temperature combustion process (dissociation) or to incomplete combustion which occurs when a temperature of combustion is too low or not enough oxidant (oxygen from air for example) is available in the combustion process. A modern approach to low emissions gas turbine engine combustion is know as DLN (Dry Low NOx) combustion. This technology relies on pre-mixing the fuel and air to form a combustible mixture which is then introduced and burned in a reaction zone of a gas turbine combustor. Low emissions are achieved due to a flame temperature lower than a flame temperature for a non-pre-mixed combustion system (fuel and air mix in the combustion reaction zone) for the same gas turbine engine operating conditions. At nominal operating conditions (base load of the gas turbine engine) a DLN combustor could be designed to achieve relatively low NOx emissions and usually CO is not a concern. As the load of the gas turbine engine is decreased from base load, the temperature of combustion decreases. In this process the NOx emissions from a DLN combustor decrease but below some temperature level CO can exceed permitted levels. Therefore a DLN combustor cannot operate in premixed mode at all load conditions of a gas turbine engine. At low loads a pilot flame can be initiated or a non-premixed mode (diffusion combustion) can be employed. Operation under these conditions results in higher emissions compared to a premixed mode of operation and may be restricted to short period of times (transients during short time periods). Exemplary embodiments described herein teach a way to extend a range of load points for which a DLN combustor can operate in a premix mode.

A load point for a gas turbine engine is defined as a percentage of nominal output generated by the gas turbine engine. A gas turbine combustor turndown is defined as a temperature range within which a combustor portion of a gas turbine engine can operate in a stable manner, without undesirable pressure pulsations while meeting emissions requirements. A gas turbine engine turndown is defined as a lower threshold load point of the gas turbine engine at which the emissions requirements can still be met. The gas turbine engine turndown is limited by a combustion system and by an upper threshold temperature in the gas turbine exhaust duct. Operation at lower load points (i.e. below turndown) is not permitted because some operational boundaries expressed in terms of emissions, dynamics, and exhaust gases temperature are violated.

In order to increase the overall efficiency a gas turbine power plant can be configured and operated in a combined cycle. That means that a relatively high temperature exhaust gas from a gas turbine engine is passed through a heat recuperator steam generator (HRSG) to produce steam that drives a steam turbine. Usually two gas turbines are connected to a steam turbine. Combined cycle operation requires that the exhaust gases leaving the gas turbine engine be within a specific temperature range. That is the exhaust temperature cannot be too high to avoid degrading the gas turbine exhaust duct and HRSG hardware. Further, the temperature should not fall below a certain temperature value to avoid a condition called forced cooling when thermal transients in steam turbine rotor and casing can degrade the turbine rotor. The two temperatures limits discussed above are referred to as the upper threshold isotherm and the lower threshold isotherm respectively.

In order to respond to seasonal and often daily changes in power demand gas turbine engines are often subjected to large sweeps in load. Maximum operation flexibility is achieved for a lowest turndown possible which in turn, as described above is limited by the available technologies (combustion and materials). Profitability models which account for spot energy and fuel prices may require the unit to be shutdown because of insufficient turndown. This strategy requires frequent re-starts which limit the ability of the unit to respond to a sudden energy demand and also reduces an operational life of the gas turbine hardware.

BRIEF DESCRIPTION OF THE INVENTION

A control system for controlling a load point of a gas turbine engine in accordance with an exemplary embodiment is provided. The gas turbine engine has a turbine portion fluidly communicating with a conduit having a flow path. The conduit is configured to receive exhaust gases from the turbine portion. The control system includes a flow restriction member coupled to the conduit and configured to move between first and second operational positions, such that when the flow restriction member is moved to the first operational position the flow restriction member does not restrict a portion of the flow path in the conduit and when the flow restriction member is moved to the second operational position the flow restriction member does restrict the flow path. The control system further includes an actuator coupled to the flow restriction member and configured to move the flow restriction member in response to an actuator control signal. The control system further includes a fuel delivery device configured to deliver fuel to a combustor portion of the gas turbine in response to a fuel control signal. The control system further includes a temperature sensor configured to generate a temperature signal indicative of a temperature level of the exhaust gases in the conduit. The control system further includes a pressure sensor to generate a pressure signal indicative of a pressure level of the exhaust gases in the conduit. The control system further includes a controller operably coupled to the actuator, the fuel delivery device, the temperature sensor, and the pressure sensor. The controller is configured to receive the temperature signal and pressure signal. The controller is further configured to generate the fuel control signal. The controller is further configured to generate the actuator control signal such that flow restriction member is moved from the first operational position to the second operational position to restrict the flow path such that the exhaust gases have a temperature level within a desired turndown temperature range, the pressure level in the exhaust gases is less than a threshold pressure level, and the load point of the gas turbine engine is adjusted to toward a target load point.

A method for controlling a load point of a gas turbine engine in accordance with another exemplary embodiment is provided. The gas turbine engine has a turbine portion coupled to a conduit having a flow path. The flow path is configured to receive exhaust gases from the turbine portion. The method includes generating a temperature signal indicative of a temperature level of the exhaust gases in the conduit that is received by a controller, utilizing a temperature sensor. The method further includes generating a pressure signal indicative of a pressure level of the exhaust gases in the conduit that is received by the controller, utilizing a pressure sensor. The method further includes generating a fuel control signal to induce a fuel delivery device to deliver fuel to the gas turbine, utilizing the controller. The method further includes generating an actuator control signal to induce an actuator to move a flow restriction member from a first operational position to a second operational position to restrict the flow path such that the exhaust gases have a temperature level within a desired turndown temperature range and the pressure level of the exhaust gases is less than a threshold pressure level, and the load point of the gas turbine engine is adjusted toward a target load point, utilizing the controller.

A power generation system in accordance with another exemplary embodiment is provided. The power generation system includes a gas turbine engine having a turbine portion fluidly communicating with a conduit having a flow path. The conduit is configured to receive exhaust gases from the turbine portion. The power generation system further includes an electrical generator operably driven by the turbine portion and generating electrical power. The power generation system further includes a flow restriction member coupled to the conduit and configured to move between first and second operational positions, such that when the flow restriction member is moved to the first operational position the flow restriction member does not restrict a portion of the flow path in the conduit and when the flow restriction member is moved to the second operational position the flow restriction member does restrict the flow path. The power generation system further includes an actuator coupled to the flow restriction member and configured to move the flow restriction member in response to an actuator control signal. The power generation system further includes a fuel delivery device configured to deliver fuel to a combustor portion of the gas turbine in response to a fuel control signal. The power generation system further includes a temperature sensor configured to generate a temperature signal indicative of a temperature level of the exhaust gases in the conduit. The power generation system further includes a pressure sensor to generate a pressure signal indicative of a pressure level of the exhaust gases in the conduit. The power generation system further includes a controller operably coupled to the actuator, the fuel delivery device, the temperature sensor, and the pressure sensor. The controller is configured to receive the temperature signal and pressure signal, the controller further configured to generate the fuel control signal. The controller is further configured to generate the actuator control signal such that flow restriction member is moved from the first operational position to the second operational position to restrict the flow path such that the exhaust gases have a temperature level within a desired turndown temperature range, the pressure level in the exhaust gases is less than a threshold pressure level, and the load point of the gas turbine engine is adjusted to toward a target load point.

DETAILED DESCRIPTION OF THE INVENTION

Figures 1, 2:
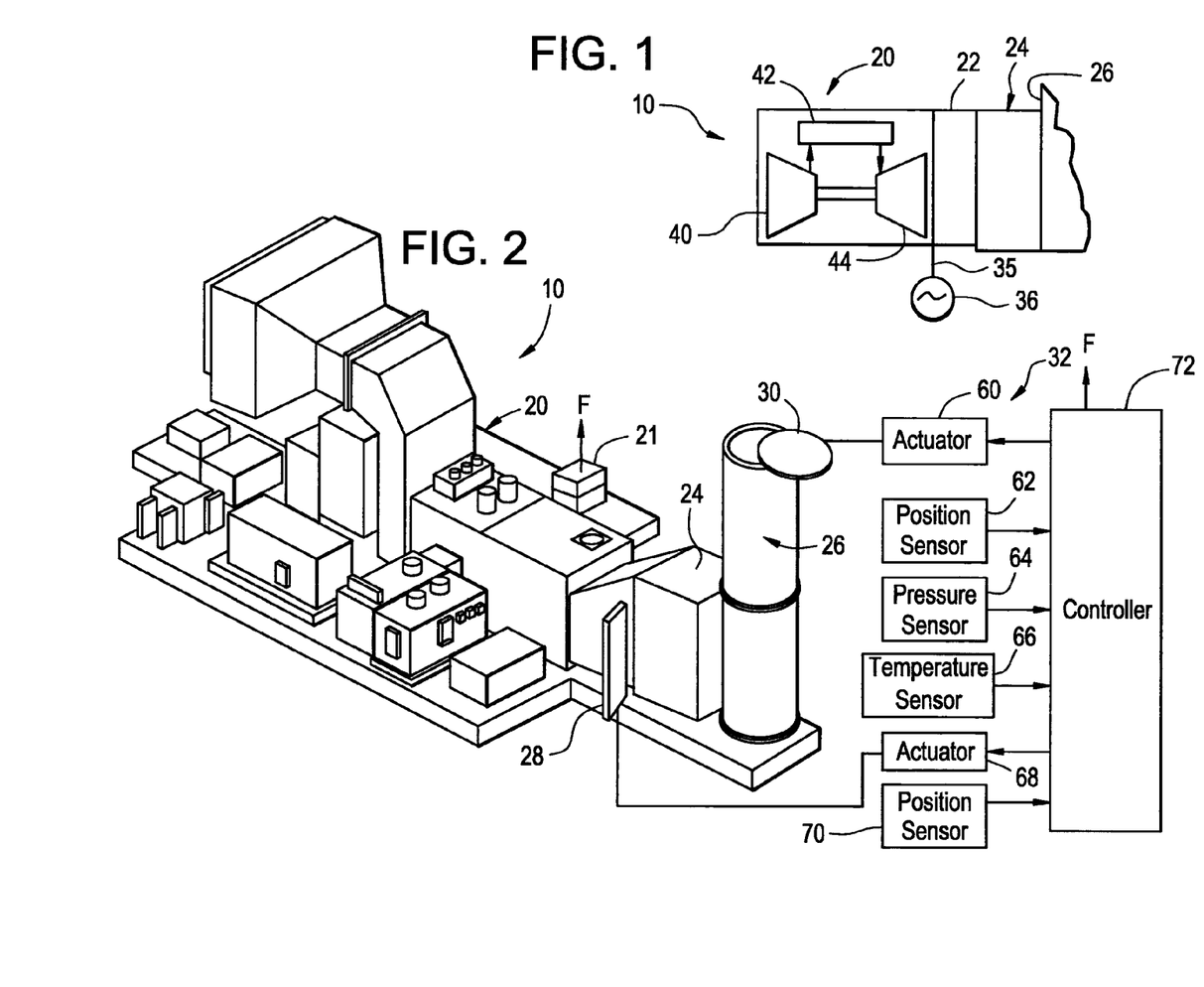
FIG. 1 is a schematic of a power generation system in accordance with an exemplary embodiment.
FIG. 2 is a schematic of the power generation system of FIG. 1 having a control system in accordance with another exemplary embodiment.

Referring to FIGS. 1 and 2, a power generation system 10 for generating electrical power is illustrated. The power generation system 10 includes a gas turbine engine 20, a fuel delivery device 21, an exhaust diffuser portion 22, a duct 24, an exhaust stack 26, flow restriction members 28, 30, a control system 32, and an electrical generator 36. An advantage of the control system 32 is that the system 32 can control the operational position of flow restriction members 28, 32 to increase a back pressure of the gas turbine engine 20 to allow a load point of the gas turbine engine 20 to be substantially decreased toward a target load point, while maintaining a temperature of exhaust gases within a desired turndown temperature range and a pressure level in the exhaust gases less than a threshold pressure level. The target load point can be in a range of 20-40% of maximum power for example. It should be noted that in an alternative embodiment, only one of the flow restriction members 28, 32 could be utilized to increase a back pressure of the gas turbine engine 20.

Figure 3:
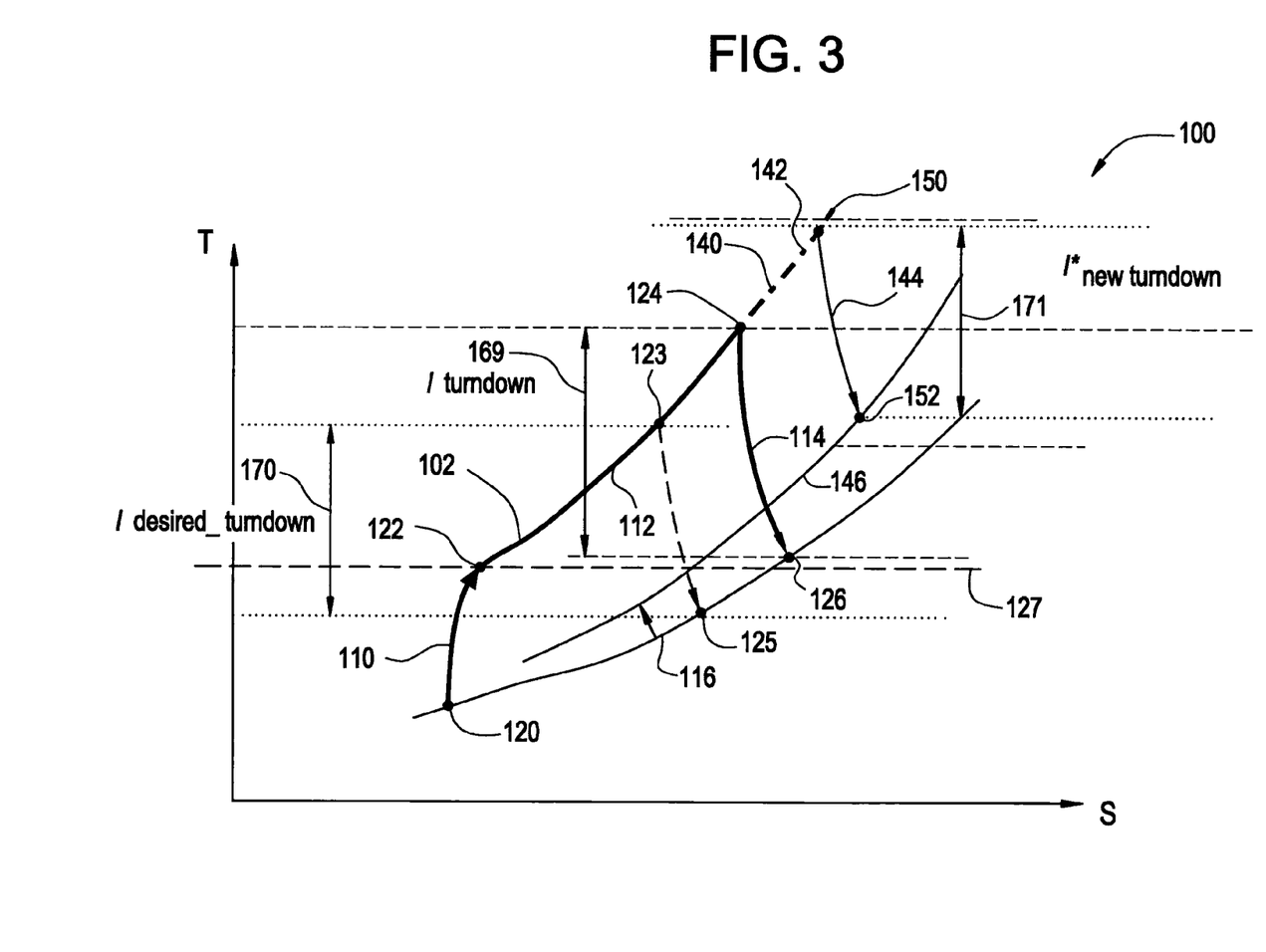
FIG. 3 is a schematic of a gas turbine thermodynamic cycle.

Referring to FIG. 3, a gas turbine thermodynamic cycle is schematically illustrated. For illustration purposes, it is assumed that the thermodynamic cycle defined by points 120-122-124-126 represents an operational cycle of a gas turbine engine at a turndown condition. The load point cannot be decreased further because either CO produced by the DLN combustor operating in premix mode exceeds permitted levels or a steam turbine forced cooling condition is being reached. Therefore, operation at lower loads (for example along thermodynamic cycle defined by points 120-122-123-125 is not permitted. These operational limitations characterize state of the art gas turbine engines equipped with a DLN combustor running in premixed mode.

A methodology to avoid the above limitations will now be described. Assume that in order to meet some efficiency goals the gas turbine engine 20 is required to operate along 120-122-123-125. It should be noted that curve 116 shown in FIG. 3 borders the gas turbine engine thermodynamic cycle. The curve 116 represents the pressure of the exhaust gas in the gas turbine exhaust duct, also called gas turbine backpressure. The thermodynamic state of the gases leaving the turbine will theoretically move along this curve 116 as the load point changes. An advantage of the control system 32, discussed below, is that the control system 32 is configured to move the curve 116 to the curve 146. The curve 146 has similar characteristics as curve 116 but is defined by an increased backpressure at a turbine portion exit. Now the thermodynamic state at the turbine portion exit will move to curve 146. When this initially occurs the gas turbine engine 20 can no longer produce "1-desired-turndown" (illustrated by segment 170 in FIG. 3) and the control system 32 controls the gas turbine engine 20 to achieve the desired load point. In some conditions, after generating the increased backpressure, the control system 32 may increase the fuel flow supplied to the combustion system, to compensate for the energy imbalance created in the thermodynamic cycle due to the increased backpressure. This action will modify the thermodynamic cycle into path 120-122-150-152. It should be noted that operation along cycle 120-122-150-152 is typically characterized by a higher combustion temperature and a higher exhaust temperature. The higher combustion temperature and higher exhaust temperature will assure an increased temperature margin to reduce a possibility of a forced cooling condition, as well as an increased temperature margin for avoiding a CO boundary for a DLN premixed combustor. The control system 32 will iterate between the amount of backpressure applied to the turbine portion and the amount of fuel flow supplied to the combustor portion until the gas turbine engine will produce the work "1-new-turndown" (illustrated by segment 171 in FIG. 3) equal to "1-desired-turndown". It should be noted that the control system 32 will include typical procedures to assure desired operation of the gas turbine engine 20 as well as the limits imposed by emissions requirements and upper threshold isotherm and the lower threshold isotherm (discussed above). Further, the "1-new-turndown" is decreased relative to the turndown, "1-turndown" represented by segment 169 in FIG. 3. An advantage of the control system 32 and method described herein is achieving a desired load point with a lower turndown without changing a design of gas turbine engine components, while maintaining or increasing the margin to CO or forced cooled condition boundaries.

Referring to FIGS. 1 and 2, the gas turbine engine 20 is connected to an output shaft 35 which is further operably coupled to an electrical generator 36. The gas turbine engine 20 has a compressor portion 40, a combustor portion 42 and a turbine portion 44. The compressor portion 40 is configured to compress an inflow of air. The combustor portion 42 is configured to receive the compressed air from the compressor portion 40 and to combust a mixture of the compressed air and fuel, which produces high pressure, high temperature exhaust gases. The turbine portion 44 is configured to receive the exhaust gases from the combustor portion 42 and rotate in response to an expansion of the exhaust gases. The turbine portion 44 is operably connected to the electrical generator 36 by the output shaft 35 for providing rotational power to the electrical generator 36 and producing electricity. The turbine portion 44 is further configured to pass the exhaust gases to the exhaust diffuser portion 22.

The fuel delivery device 21 is configured to provide fuel to the combustor portion 42 of the gas turbine engine 20. During operation, the fuel delivery device 21 is configured to provide fuel to the combustor portion 42, in response to a fuel control signal from the controller 72. When the load point of the gas turbine engine 20 is to be decreased, the controller 72 can generate a fuel control signal that induces the fuel delivery device 21 to increase an amount of fuel delivered to the combustor portion 42 to satisfy operational requirements.

The exhaust diffuser portion 22 is configured to route exhaust gases from the turbine portion 44 to the duct 24. The exhaust diffuser portion 22 is operably coupled between the turbine portion 44 and the duct 24.

The flow restriction member 28 is configured to control an area of a flow path in the duct 24. In one exemplary embodiment, the flow restriction member 28, is a baffle plate for example, that is operably disposed in the duct 24 to control an area of the flow path in the duct 24. The controller 72 can generate a first actuator control signal that is received by an actuator 68 to induce the actuator 68 to move the flow restriction member 28 to a first operational position, where the flow path within the duct 24 is not restricted. When this occurs, a back pressure of the exhaust gases on the turbine portion 44 is decreased. The controller 72 can also generate a second actuator control signal that is received by the actuator 68 to induce the actuator 68 to move the flow restriction member 28 to a second operational position, where the flow path within the duct 24 is restricted. When this occurs, a back pressure of the exhaust gases on the turbine portion 44 is increased.

The exhaust stack 26 is provided to receive exhaust gases from the duct 24 and to emit the exhaust gases therefrom. The flow restriction member 30 is configured to control an area of a flow path in the exhaust stack 26. In one exemplary embodiment, the flow restriction member 30, is a baffle plate for example, that is operably disposed in the exhaust stack 26 to control an area of the flow path in the exhaust stack 26. The controller 72 can generate a first actuator control signal that is received by an actuator 60 to induce the actuator 60 to move the flow restriction member 30 to a first operational position, where the flow path within the exhaust stack 26 is not restricted. When this occurs, a back pressure of the exhaust gases on the turbine portion 44 is decreased. The controller 72 can generate a second actuator control signal that is received by the actuator 60 to induce the actuator 60 to move the flow restriction member 30 to a second operational position, where the flow path within the exhaust stack 26 is restricted. When this occurs, a back pressure of the exhaust gases on the turbine portion 44 is increased.

The electrical generator 36 is provided to generate electrical power. The electrical generator 36 is operably coupled via the output shaft 35 to the turbine portion 44. When the turbine portion 44 rotates the output shaft 35, the output shaft 35 drives the generator 36 to generate electricity.

The control system 32 is provided to control operation of the gas turbine engine 20. In particular, the control system 32 is provided to control a load point of the gas turbine engine 20, as will be explained in further detail below. The control system 32 includes the actuator 60, a position sensor 62, a pressure sensor 64, a temperature sensor 66, the actuator 68, a position sensor 70, and the controller 72.

The position sensor 62 is provided to generate a position signal indicative of an operational position of the flow restriction member 30. The controller 72 receives the position signal from the position sensor 62 and determines the operational position of the flow restriction member 30 based thereon.

The pressure sensor 64 is provided to generate a pressure signal indicative of a pressure level of exhaust gases in the duct 24. The controller 72 receives the pressure signal from the pressure sensor 64 and determines a pressure level based thereon.

The temperature sensor 66 is provided to generate a temperature signal indicative of a temperature level of exhaust gases in the duct 24. The controller 72 receives the temperature signal from the temperature sensor 66 and determines a temperature level based thereon.

The position sensor 70 is provided to generate a position signal indicative of an operational position of the flow restriction member 28. The controller 72 receives the position signal from the position sensor 70 and determines the operational position of the flow restriction member 28 based thereon.

The controller 72 is provided to control operation of the gas turbine generator 20. In particular, the controller 72 is provided to control a load point of the gas turbine generator 20, by controlling an operational position of the flow restriction members 20, 30 and an amount of fuel delivered by the fuel delivery device 21 to the gas turbine engine 20. The controller 72 is operably coupled to the actuator 60, the position sensor 62, the pressure sensor 64, the temperature sensor 66, the actuator 68, the position sensor 70 and the fuel delivery device 21.

Figure 4:
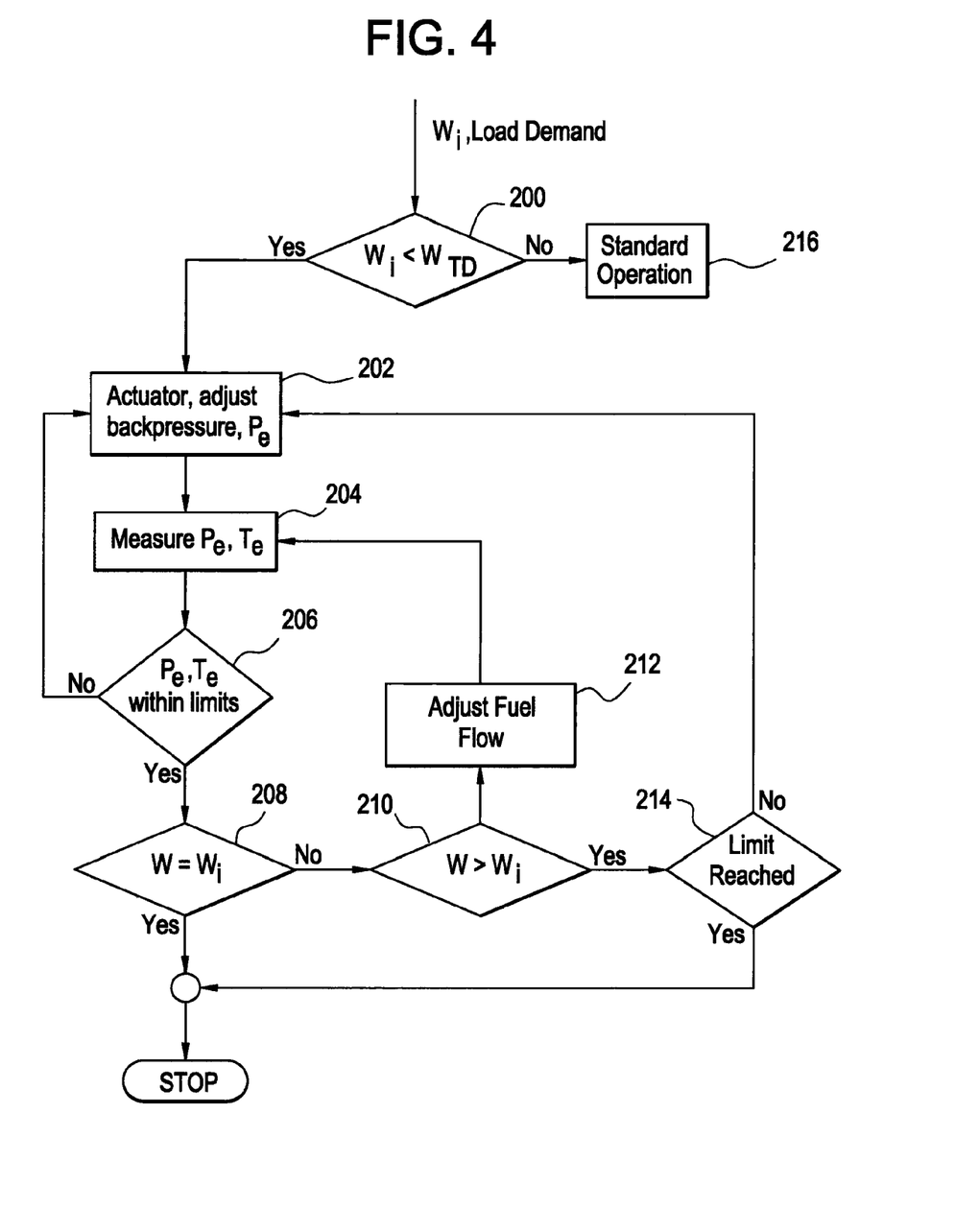
FIG. 4 is a flowchart of a method for controlling a load point of a gas turbine engine in accordance with another exemplary embodiment.

Referring to FIG. 4, a flowchart of a method for controlling a load point of the gas turbine engine 20 will now be explained.

At step 200, the controller 72 makes a determination as to whether a requested load point ($W_i$) is less than a turndown load point ($W_{TD}$). If the value of step 200 equals "yes", the method advances to step 202. Otherwise, the method advances to step 216 and continues normal operation.

At step 202, the controller 72 generates actuator control signals to induce the actuators 68, 60 adjust operational positions of the flow restriction members 28, 30, respectively, to increase a back pressure of exhaust gases in the turbine portion 44.

At step 204, the controller 72 receives a pressure signal from the pressure sensor 64 and determines a pressure level ($P_e$) of the exhaust gases in the turbine portion 44. Further, the controller 72 receives a temperature signal from the temperature sensor 66 and determines a temperature level ($T_e$) of exhaust gases in the turbine portion 44.

At step 206, the controller 72 makes a determination as to whether (i) the pressure level ($P_e$) is within a desired pressure range and (ii) whether the temperature level ($T_e$) is within a desired temperature range. If the value of step 206 equals "yes", the method advances to step 208. Otherwise, the method returns to step 202.

At step 208, the controller 72 makes a determination as to whether an actual load point (W) is equal to the requested load point ($W_i$). If the value of step 208 equals "yes", the method is exited. Otherwise, the method advances to step 210.

At step 210, the controller 72 makes a determination as to whether an actual load point (W) is greater than the requested load point ($W_i$). If the value of step 210 equals "yes", the method advances to step 214. Otherwise, the method advances to step 212.

At step 212, the controller 72 generates a control signal to induce the fuel delivery device 21 to increase an amount of fuel being delivered to the turbine portion 44. After step 212, the method returns to step 204.

Referring again to step 210, when the value of step 210 equals "yes", the method advances to step 214. At step 214, the controller 72 makes a determination as to whether operational control limits associated with a gas turbine engine 20 have been reached. If the value of step 214 equals "yes", the method is exited. Otherwise, the method returns to step 202.

Figure 5:
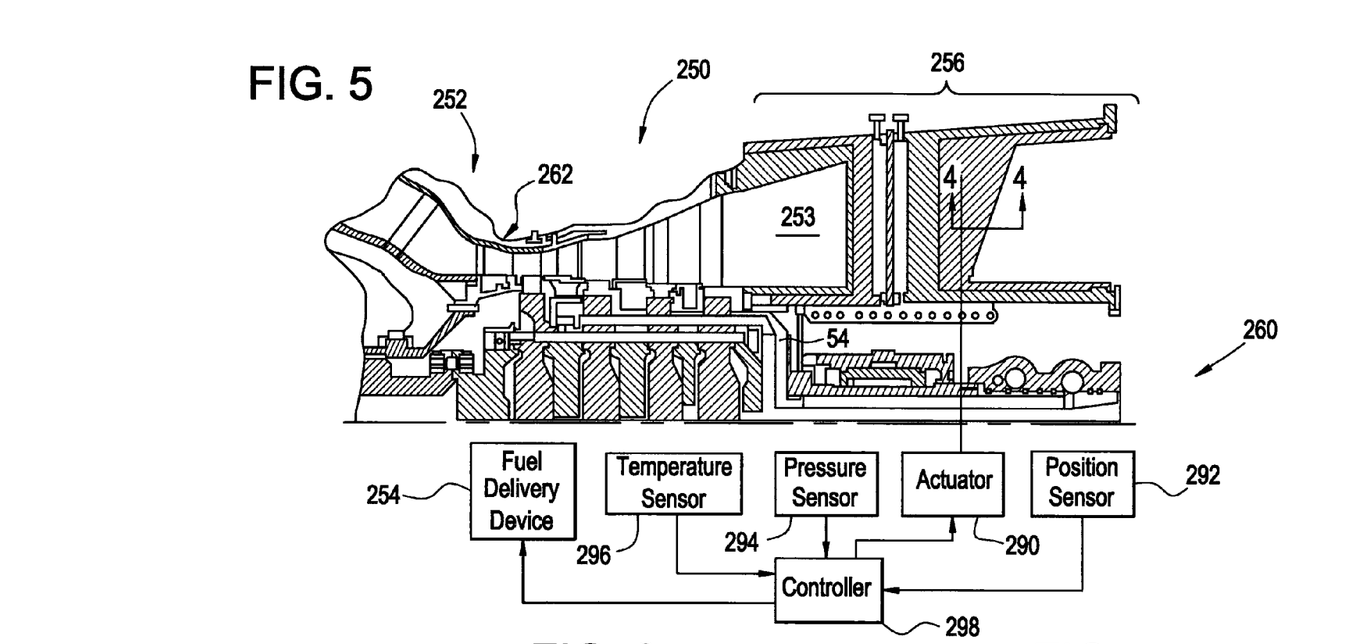
FIG. 5 is a schematic of another power generation system having a control system in accordance with another exemplary embodiment.

Referring to FIG. 5, the power generation system 250 includes a gas turbine engine 252, a fuel delivery device 254, and exhaust diffuser portion 256, a flow restriction member 258, and a control system 260. An advantage of the control system 260 is that the system 260 can control an operational position of flow restriction member 258 to increase a back pressure of the turbine portion 262 to allow a load point of the gas turbine engine 252 to be substantially decreased, while maintaining a temperature of exhaust gases within a desired turndown temperature range and a pressure level in the exhaust gases less than a threshold pressure level. The gas turbine engine 252 includes a turbine portion 262, an output shaft (not shown) and an electrical generator (not shown).

The fuel delivery device 256 is configured to provide fuel to the gas turbine engine 252. During operation, the fuel delivery device 256 is configured to provide fuel to the gas turbine engine 252, in response to a fuel control signal from the controller 298. When the load point of the gas turbine engine 252 is to be decreased, the controller 298 can generate a fuel control signal that induces the fuel delivery device 256 to increase an amount of fuel delivered to the gas turbine engine 252.

The exhaust diffuser portion 256 is configured to route exhaust gases from the turbine portion 262 to a duct (not shown). The exhaust diffuser portion 256 is operably coupled between the turbine portion 262 and the duct.

Figure 6:
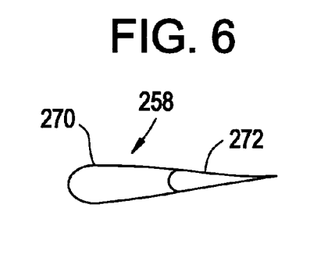
FIG. 6 is a schematic of a flow restriction member utilized in the power generation system of FIG. 5.
Figure 7:
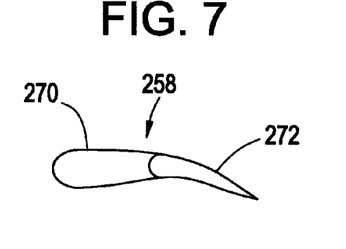
FIG. 7 is another schematic of the flow restriction member utilized in the power generation system of FIG. 5.

Referring to FIGS. 5-7, the flow restriction member 258 is configured to control an area of a flow path in the exhaust diffuser portion 256. In one exemplary embodiment, the flow restriction member 258 includes a strut 270 operably coupled to a baffle member 272. The strut 270 is fixedly coupled to a portion of the exhaust diffuser portion 256. The baffle member 272 is rotatably coupled to the strut 270. An actuator 290 is operably coupled to the baffle member 272 for moving the baffle member 272, in response to a control signal from the controller 298. In particular, the actuator 290 can move the baffle member 272 between a first operational position (as shown in FIG. 6) in which a flow path in the exhaust diffuser portion 256 is not restricted, and a second operational position (as shown in FIG. 7) in which the flow path in the exhaust diffuser portion 256 is restricted. When the actuator 290 moves the baffle member 272 from the first operational position to the second operational position, a back pressure of exhaust gases in the turbine portion 262 is increased.

The control system 260 is provided to control operation of the gas turbine engine 252. In particular, the control system 260 is provided to control a load point of the gas turbine generator 252. The control system 260 includes the actuator 290, a position sensor 292, a pressure sensor 294, a temperature sensor 296 and the controller 298.

The position sensor 292 is provided to generate a position signal indicative of an operational position of the flow restriction member 258. The controller 298 receives the position signal from the position sensor 292 and determines the operational position of the flow restriction member 258 based thereon.

The pressure sensor 294 is provided to generate a pressure signal indicative of a pressure level of exhaust gases in the exhaust diffuser portion 256. The controller 298 receives the pressure signal from the pressure sensor 294 and determines a pressure level based thereon.

The temperature sensor 296 is provided to generate a temperature signal indicative of a temperature level of exhaust gases in the exhaust diffuser portion 256. The controller 298 receives the temperature signal from the temperature sensor 296 and determines a temperature level based thereon.

The controller 298 is provided to control operation of the gas turbine engine 252. In particular, the controller 298 is provided to control a load point of the gas turbine engine 252, by controlling an operational position of the flow restriction member 258 and an amount of fuel delivered by the fuel delivery device 254 to the gas turbine engine 252, in a substantially similar manner as described in the flowchart of FIG. 4. The controller 298 is operably coupled to the actuator 290, the position sensor 292, the pressure sensor 294, the temperature sensor 296, and the fuel delivery device 254.

Figure 8:
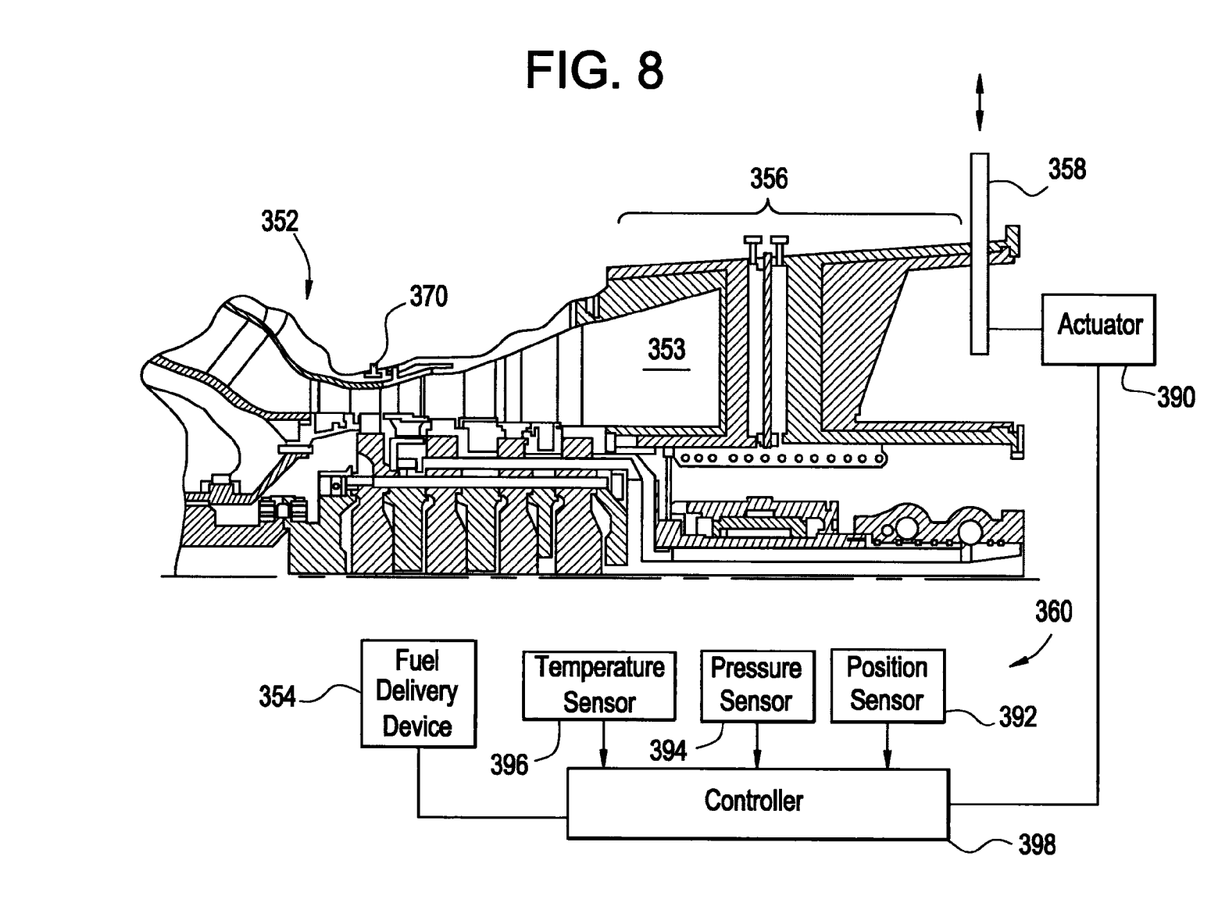
FIG. 8 is a schematic of another power generation system having a control system in accordance with another exemplary embodiment.

Referring to FIG. 8, the power generation system 350 includes a gas turbine engine 352, a fuel delivery device 354, and exhaust diffuser portion 356, a flow restriction member 358, and a control system 360. An advantage of the control system 360 is that the system 360 can control an operational position of flow restriction member 358 to increase a back pressure of the gas turbine engine 352 to allow a load point of the gas turbine engine 352 to be substantially decreased toward a target load point, while maintaining a temperature of exhaust gases within a desired turndown temperature range and a pressure level in the exhaust gases less than a threshold pressure level. The gas turbine engine 352 includes a turbine portion 370, an output shaft (not shown) and an electrical generator (not shown).

The primary difference between the power generation system 350 and the power generation system 250 is the type of flow restriction member utilized therein. In particular, the flow restriction member 358 is a plate that is moved linearly between a first operational position and a second operational position. An actuator 390 is operably coupled to the flow restriction member 358 for moving the flow restriction member 358, in response to a control signal from the controller 398. In particular, the actuator 390 can move the flow restriction member 358 between a first operational position in which a flow path in the exhaust diffuser portion 356 is not restricted, and a second operational position (as shown in FIG. 8) in which the flow path in the exhaust diffuser portion 356 is restricted. When the actuator 390 moves the flow restriction member 358 from the first operational position to the second operational position, a back pressure of exhaust gases in the turbine portion 370 is increased.

Figure 9:
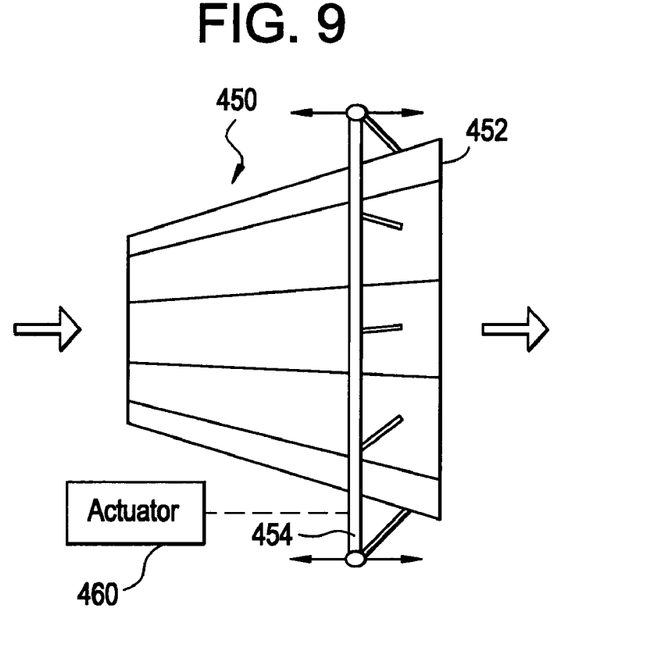
FIG. 9 is a schematic of another exemplary flow restriction member.
Figure 10:
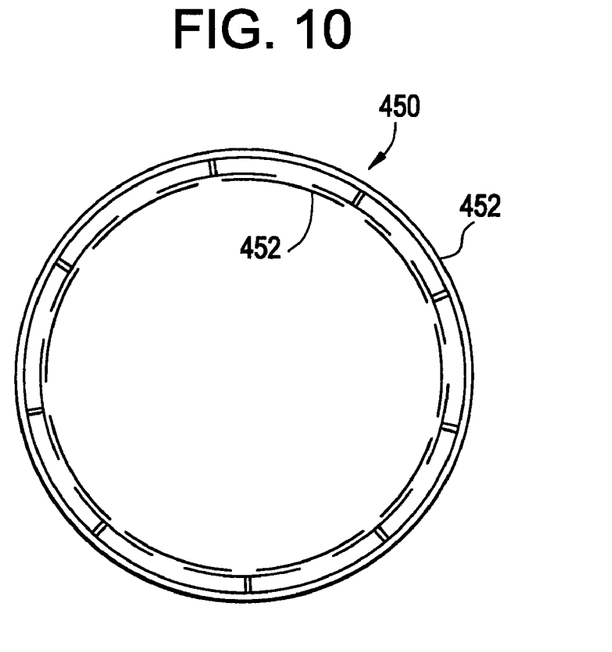
FIG. 10 is a cross-sectional schematic of the flow restriction member of FIG. 9.

Other types of flow restriction members that could alternately be utilized in the power generation systems 10, 250 and 350 instead of the flow restriction members 28, 30, 258 and 358, will now be explained. Referring to FIG. 9, a flow restriction member 450 for generating an increased back pressure in exhaust gases is illustrated. The flow restriction member 450 includes a diffuser portion 452 and a ring portion 454. An actuator 460 is operably coupled to the ring portion 454. When the actuator 460 moves the ring portion 454 in a first direction (e.g., rightwardly in FIG. 9), the effective area of the flow path in the diffuser portion 452 is decreased, which increases the amount of back pressure of exhaust gases being received by the flow restriction member 450. When the actuator 460 moves the ring portion 454 in a second direction (e.g., leftwardly in FIG. 9), the effective area of the flow path in the diffuser portion 452 is increased, which decreases the amount of back pressure of exhaust gases being received by the flow restriction member 450.

The control systems and the method for controlling a load point of a gas turbine generator provide a substantial advantage over other systems and methods. In particular, the control system and the method provide a technical effect of adjusting the load point toward a relatively low target low point such that the exhaust gases have a temperature level within a desired turndown temperature range and the pressure level of the exhaust gases is less than a threshold pressure level.

While the invention has been described with reference to an exemplary embodiment, various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for controlling a load point of a gas turbine engine, the gas turbine engine having a turbine portion coupled to a conduit having a flow path, the flow path configured to receive exhaust gases from the turbine portion, the method comprising;

generating a temperature signal indicative of a temperature level of the exhaust gases in the conduit that is received by a controller, utilizing a temperature sensor;

generating a pressure signal indicative of a pressure level of the exhaust gases in the conduit that is received by the controller, utilizing a pressure sensor;

generating a fuel control signal to induce a fuel delivery device to deliver fuel to the gas turbine engine, utilizing the controller; and generating an actuator control signal to induce an actuator to move a flow restriction member from a first operational position to a second operational position to restrict the flow path such that the exhaust gases have a temperature level within a desired turndown temperature range and the pressure level of the exhaust gases is less than a threshold pressure level, and the load point of the gas turbine engine is adjusted toward a target load point, utilizing the controller.

2. The method of claim 1, wherein the load point of gas turbine engine is adjusted toward the target load point by decreasing the load point.

3. The method of claim 1, wherein at least one exhaust gas constituent of the exhaust gases is maintained within a desired exhaust gas constituent range after the flow restriction member is moved from the first operational position to the second operational position.

4. The method of claim 1, wherein the conduit comprises at least a portion of a duct in fluid communication with the turbine portion.

5. The method of claim 1, wherein the conduit comprises at least a portion of an exhaust stack in fluid communication with the turbine portion.

6. The method of claim 1, wherein the actuator is disposed in the conduit.

7. A method for controlling a load point of a gas turbine engine, the gas turbine engine having a turbine portion coupled to a conduit having a flow path, the flow path configured to receive exhaust gases from the turbine portion, the method comprising;

generating a temperature signal indicative of a temperature level of the exhaust gases in the conduit that is received by a controller, utilizing a temperature sensor;

generating a pressure signal indicative of a pressure level of the exhaust gases in the conduit that is received by the controller, utilizing a pressure sensor; and generating an actuator control signal to induce an actuator to move a flow restriction member from a first operational position to a second operational position to restrict the flow path such that the exhaust gases have a temperature level within a desired turndown temperature range and the pressure level of the exhaust gases is less than a threshold pressure level, and the load point of the gas turbine engine is adjusted toward a target load point, utilizing the controller.

8. The method of claim 7, wherein the load point of gas turbine engine is adjusted toward the target load point by decreasing the load point.

9. The method of claim 7, wherein at least one exhaust gas constituent of the exhaust gases is maintained within a desired exhaust gas constituent range after the flow restriction member is moved from the first operational position to the second operational position.

10. The method of claim 7, wherein the conduit comprises at least a portion of a duct in fluid communication with the turbine portion.

11. The method of claim 7, wherein the conduit comprises at least a portion of an exhaust stack in fluid communication with the turbine portion.

12. The method of claim 7, wherein the actuator is disposed in the conduit.

* * * * *